United States Patent
Wajcer et al.

(10) Patent No.: US 7,778,314 B2
(45) Date of Patent: Aug. 17, 2010

(54) APPARATUS FOR AND METHOD OF FAR-END CROSSTALK (FEXT) DETECTION AND ESTIMATION

(75) Inventors: Daniel Wajcer, Beit-Yehoshua (IL); Naftali Sommer, Rishon Letzion (IL); Itay Lusky, Hod Hasharon (IL)

(73) Assignee: Texas Instruments Incorporated, Dallas, TX (US)

(*) Notice: Subject to any disclaimer, the term of this patent is extended or adjusted under 35 U.S.C. 154(b) by 1140 days.

(21) Appl. No.: 11/381,574

(22) Filed: May 4, 2006

(65) Prior Publication Data

US 2007/0258514 A1    Nov. 8, 2007

(51) Int. Cl.
*H04B 1/38* (2006.01)

(52) U.S. Cl. ........................ 375/220; 375/219; 375/222; 375/260; 375/267; 375/316; 370/201; 370/268; 370/446

(58) Field of Classification Search ................. 375/219, 375/220, 221, 233, 259, 260, 261, 295, 306, 375/242–243, 267, 316, 359; 370/210, 268, 370/446
See application file for complete search history.

(56) References Cited

U.S. PATENT DOCUMENTS

| 7,561,627 | B2* | 7/2009 | Chow et al. | 375/260 |
|---|---|---|---|---|
| 7,573,943 | B2* | 8/2009 | Cioffi | 375/260 |
| 2003/0072380 | A1* | 4/2003 | Huang | 375/261 |
| 2006/0146945 | A1* | 7/2006 | Chow et al. | 375/260 |
| 2007/0143811 | A1* | 6/2007 | Powell | 725/127 |
| 2009/0180529 | A1* | 7/2009 | Agazzi et al. | 375/233 |
| 2009/0290622 | A1* | 11/2009 | Takatori et al. | 375/219 |

* cited by examiner

*Primary Examiner*—Shuwang Liu
*Assistant Examiner*—Hirdepal Singh
(74) *Attorney, Agent, or Firm*—Steven A. Shaw; W. James Brady; Frederick J. Telecky, Jr.

(57) ABSTRACT

A novel and useful mechanism for the detection and estimation of far-end cross talk (FEXT) caused by transmissions over adjacent wire pairs or cables. The detection and estimation technique of the invention can be used to identify FET impairments in Ethernet and DSL systems. The detection and estimation scheme is performed utilizing an adaptive FEXT canceller filter for detection purposes during normal operation of the system. FEXT filter tap coefficients are determined one at a time using a mechanism shared amongst all taps. Once adapted, the filter coefficients can be used to estimate FEXT strength and to determine spectral measurements of the FEXT impairment noise.

13 Claims, 5 Drawing Sheets

APPARATUS FOR AND METHOD OF FAR-END CROSSTALK (FEXT) DETECTION AND ESTIMATION

FIELD OF THE INVENTION

The present invention relates to the field of data communications and more particularly relates to an apparatus for far-end crosstalk (FEXT) detection and estimation caused by transmissions from adjacent cable pairs.

BACKGROUND OF THE INVENTION

Modem network communication systems are generally of either the wired or wireless type. Wireless networks enable communications between two or more nodes using any number of different techniques. Wireless networks rely on different technologies to transport information from one place to another. Several examples, include, for example, networks based on radio frequency (RF), infrared, optical, etc. Wired networks may be constructed using any of several existing technologies, including metallic twisted pair, coaxial, optical fiber, etc.

Communications in a wired network typically occurs between two communication transceivers over a length of cable making up the communications channel. Each communications transceiver comprises a transmitter and receiver components. The receiver component typically comprises one or more cancellers. Several examples of the type of cancellers typically implemented in Ethernet transceivers, especially gigabit Ethernet transceivers include, echo cancellers, near-end crosstalk (NEXT) cancellers, far-end crosstalk cancellers (FEXT), etc.

The deployment of faster and faster networks is increasing at an ever quickening pace. Currently, the world is experiencing a vast deployment of gigabit Ethernet (GE) devices. As the number of installed gigabit Ethernet nodes increases, the need for reliable, comprehensive and user-friendly cable diagnostic tools has become more important than ever. The wide variety of cables, topologies and connectors deployed results in the need for non-intrusive identification and reporting of cable faults. It would be desirable to have a system capable of identifying and characterizing noise sources affecting a link and reporting these noise sources in the event the noise source exceeds a permitted envelope, as defined by the relevant standards.

The ability to gather diagnostics on the cable is particularly useful in the case where physical access to the cable is extremely difficult or impossible. Further, it is desirable to have the cable diagnostics capabilities built into the communications transceiver without requiring significant modification to existing transceivers. One of the impairments commonly encountered in Ethernet networks, especially gigabit Ethernet networks, is FEXT noise.

The estimation of the FEXT impairment is typically performed using residual noise measurements made during the regular operating mode of the system. The noise impairment is calculated using a simple energy calculation. The disadvantage of such a measurement, however, is that the measured noise in actuality comprises a combination of several noise sources, such as thermal noise, NEXT noise, FEXT noise and many others. As a result, isolation of the FEXT noise is not possible or at best is inaccurate.

Another prior art approach to estimating the FEXT noise requires stopping the normal operation of the system and transmitting on adjacent interfering cables (i.e. wire pairs) only, and measuring the noise present on the cable or wire pair under test. A disadvantage of such a system is that the system must be stopped from its regular communication tasks. Further, monitoring and processing need to be performed, preferably by a well-trained technician. While this method achieves the goal of measuring the FEXT noise, the measurement procedure is complex and it interferes with the regular operation of the system. Moreover, stopping the normal operation of the system is not always possible.

Thus, there is a need for a mechanism for detecting and estimating the FEXT impairment in a communications system such as a gigabit Ethernet or DSL system that can be incorporated into a conventional communications transceiver that is efficient and is relatively low cost in terms of hardware requirements.

SUMMARY OF THE INVENTION

The present invention is a novel and useful mechanism for the detection and estimation of far-end cross talk (FEXT) caused by signal transmissions over adjacent pairs of wires or cables. The FEXT detection and estimation technique of the invention can be used to identify FEXT impairments in numerous types of communication systems such as Ethernet and DSL systems. The FEXT detection and estimation scheme of the invention is performed utilizing an adaptive FEXT canceller filter wherein the canceller filter is used for detection purposes instead of cancellation purposes.

Further, the canceller filter mechanism can be active during normal operation of the system without affecting the performance of the communication system. FEXT filter tap coefficients are determined tap by tap, one at a time using a hardware mechanism that is shared amongst all the filter taps. Once adaptation is achieved, the filter coefficients can be used to estimate FEXT strength by calculating the energy of the FEXT coefficients. In addition, spectral measurements of the FEXT impairment noise can be made based on the FEXT filter coefficients.

Note that the FEXT detector/estimator of the present invention can be used either with or without actual FEXT cancellation during normal operation of the system. In applications where mitigation of the FEXT noise is not required, the present invention provides an efficient, low cost (in terms of hardware resources) mechanism for obtaining the FEXT filter coefficients.

Although the mechanism of the present invention can be used in numerous types of communication networks, to aid in illustrating the principles of the present invention, the FEXT detector/estimator mechanism is described in the context of a FEXT detector/estimator incorporated in a gigabit Ethernet transceiver. It is appreciated that the invention is not limited to the example applications presented but can be applied to other communication systems as well without departing from the scope of the invention.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

Therefore there is provided in accordance with the invention, a method of estimating and detecting levels of far-end crosstalk (FEXT), the method comprising the steps of estimating a coefficient of a multi-tap FEXT filter utilizing a single tap FEXT canceller training module and performing the step of estimating repeatedly for each tap coefficient in the FEXT filter.

There is also provided in accordance with the invention, a far-end crosstalk (FEXT) detector comprising a first delay line adapted to receive a plurality of symbol decisions and to output delayed symbol decisions therefrom and a second delay line adapted to receive a plurality of slicer errors and to output delayed slicer errors therefrom and single tap FEXT canceller training means coupled to the delay lines and operative to generate a single FEXT filter coefficient as a function of a previous FEXT filter coefficient update, the delayed symbol decisions and delayed decision error signal.

There is further provided in accordance with the invention, an apparatus for estimating far-end crosstalk (FEXT) in a communications system comprising a decision error input, a symbol decision input, a first delay line coupled to the symbol decision input and operative to generate delayed symbols therefrom, a second delay line coupled to the slicer error input and operative to generate delayed slicer error therefrom and training means operative to calculate a current single tap FEXT filter coefficient update as a function of a previous FEXT filter coefficient update, the decision error input and the delayed symbols.

There is also provided in accordance with the invention, a communications transceiver comprising a transmitter coupled to the communications channel, a receiver coupled to the communications channel, a far-end crosstalk (FEXT) detector comprising a decision error input, a symbol decision input, a first delay line coupled to the symbol decision input and operative to generate delayed symbols therefrom, a second delay line coupled to the decision error input and operative to generate delayed decision errors therefrom and training means operative to calculate a current single tap FEXT filter coefficient update as a function of a previous FEXT filter coefficient update, the delayed decision errors and the delayed symbols.

BRIEF DESCRIPTION OF THE DRAWINGS

The invention is herein described, by way of example only, with reference to the accompanying drawings, wherein.

DETAILED DESCRIPTION OF THE INVENTION
Notation Used Throughout
The following notation is used throughout this document.

| Term | Definition |
| --- | --- |
| AGC | Automatic Gain Control |
| ANEXT | Alien Near-End Crosstalk |
| ASIC | Application Specific Integrated Circuit |
| AWGN | Additive White Gaussian Noise |
| DSL | Digital Subscriber Line |
| DSP | Digital Signal Processor |
| ELFEXT | Equal Level Far-End Crosstalk |
| FBE | Feedback Equalizer |
| FEXT | Far-End Crosstalk |
| FFE | Feed Forward Equalizer |
| FIR | Finite Impulse Response |
| FPGA | Field Programmable Gate Array |
| GE | Gigabit Ethernet |
| HDL | Hardware Description Language |
| IC | Integrated Circuit |
| IEEE | Institute of Electrical and Electronics Engineers |
| ISI | Intersymbol Interference |
| LMS | Least Mean Square |
| LPF | Low Pass Filter |
| MDELFEXT | Multiple Disturber Equal Level Far-End Crosstalk |
| NEXT | Near-End Crosstalk |
| PSELFEXT | Power Sum Equal Level Far-End Crosstalk |
| PSNEXT | Power Sum Near-End Crosstalk |
| RF | Radio Frequency |
| STP | Shielded Twisted Pair |
| UTP | Unshielded Twisted Pair |

DETAILED DESCRIPTION OF THE INVENTION

The present invention provides a useful and novel mechanism for the detection and estimation of FEXT impairment caused by signal transmission over adjacent wire pairs or cables. The detection and estimation technique of the invention can be used to identify FEXT impairments in numerous types of communication systems such as gigabit Ethernet and DSL based systems. The detection and estimation scheme is performed utilizing an adaptive FEXT canceller filter that is normally used for canceling, for detection purposes. In accordance with the invention, the FEXT detection/estimation mechanism is operative during normal operation of the system without requiring a cessation in transmission. Thus, operation of the invention does not affect the performance of the system it is incorporated in.

In operation, the FEXT filter tap coefficients are determined one at a time (i.e. tap by tap) using a hardware mechanism that is shared amongst all taps. Once adapted, the filter coefficients can be used to estimate FEXT strength and to determine spectral measurements of the FEXT impairment noise.

To aid in understanding the principles of the present invention, the description of the FEXT detection and estimation mechanism is provided in the context of a gigabit Ethernet transceiver circuit that can be realized in an integrated circuit (IC). The FEXT detection and estimation mechanism of the present invention has been incorporated in an Ethernet IC adapted to provide 10 Base-T, 100 Base-T and 1000 Base-T communications over a metallic twisted pair channel. Although the invention is described in the context of a gigabit Ethernet PHY communications link, it is appreciated that one skilled in the art can apply the principles of the invention to other communication systems without departing from the scope of the invention.

It is appreciated by one skilled in the art that the FEXT detection and estimation mechanism of the present invention can be adapted for use with numerous other types of wired communications networks such as asynchronous or synchronous DSL channels, coaxial channels, etc. without departing from the scope of the invention.

Note that throughout this document, the term communications device is defined as any apparatus or mechanism adapted to transmit, receive or transmit and receive data through a medium. The term communications transceiver is defined as any apparatus or mechanism adapted to transmit and receive data through a medium. The communications device or communications transceiver may be adapted to communicate over any suitable medium, including wired media such as twisted pair cable or coaxial cable. The term Ethernet network is defined as a network compatible with any of the IEEE 802.3 Ethernet standards, including but not limited to 10 Base-T, 100 Base-T or 1000 Base-T over shielded or unshielded twisted pair wiring. The terms communications channel, link and cable are used interchangeably.

Figure 1:
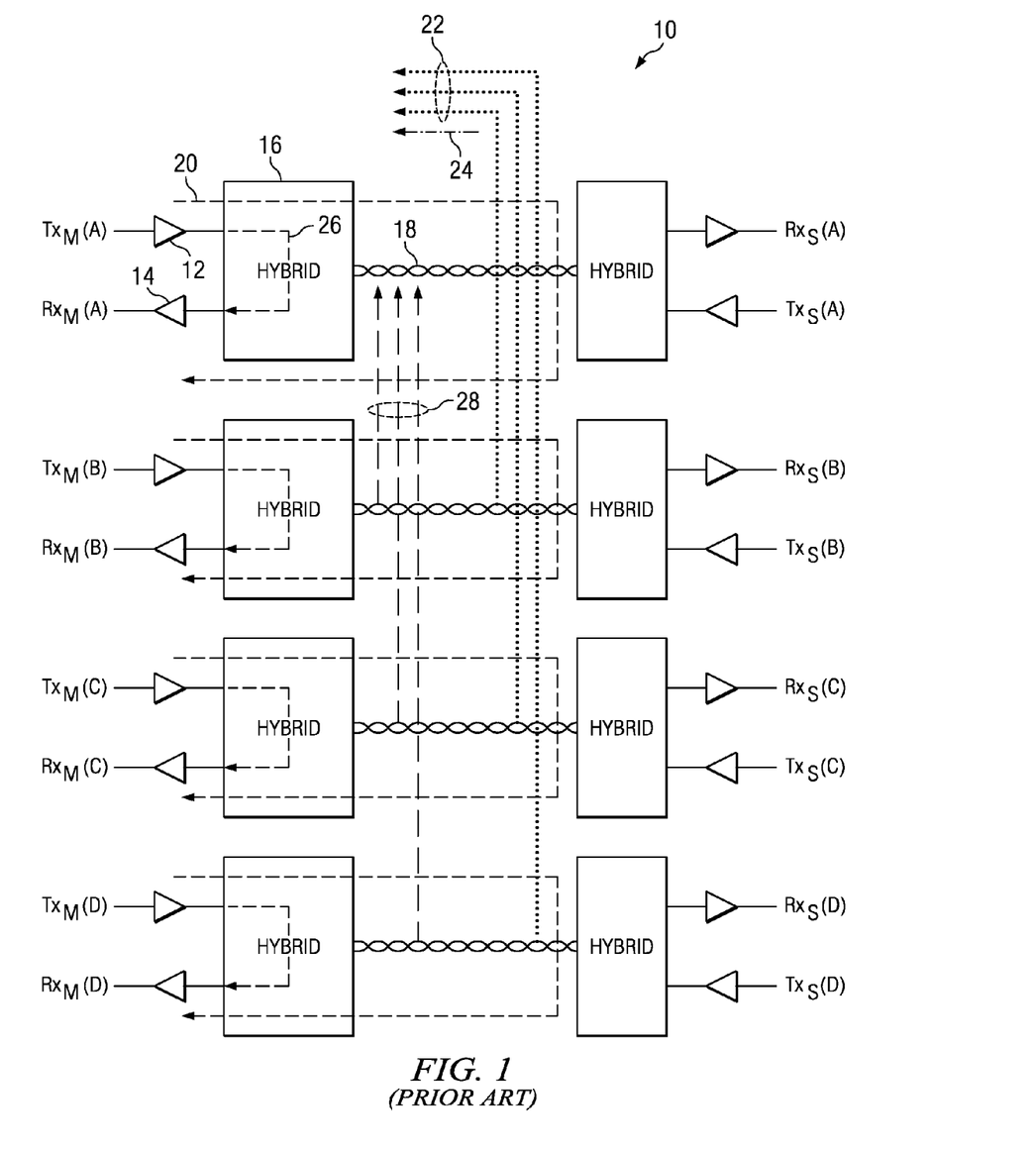
FIG. 1 is a block diagram illustrating the typical 1000 Base-T noise environment.

The Ethernet PHY operating environment is typically exposed to diverse interference sources. A block diagram illustrating the typical 1000 Base-T noise environment is shown in FIG. 1. The environment, generally referenced 10, comprises two transceivers Master (M) and Slave (S), each comprising a plurality of transmitters 12, receivers 14 and hybrid circuits 16. The transceivers are coupled by a plurality of twisted pair cables 18. A gigabit Ethernet communications link is characterized by full duplex transmission over Category 5 and higher cable that may be shielded (STP) or unshielded twisted pair (UTP) cable. The cable comprises four twisted metallic copper pairs wherein all four pairs are used for both transmission and reception. Note that for notation purposes, each one of the twisted pairs is referred to as a 'channel' and the combined four twisted pair bundle generating one gigabit Ethernet connection is referred to as a 'cable'.

In operation, each transceiver receives an input data stream from an external data source such as a host or other entity (not shown). The transceiver generates an output symbol stream from the input data stream and transmits the output symbol stream over the communications channel to the transceiver on the other side. The transceivers on either end of a channel are considered link partners. One is designated a master, the other a slave. A link partner can be either active or inactive. An inactive link partner is a transceiver that is not transmitting at the moment. An active link partner is a transceiver that is currently transmitting.

In the receive direction, each transceiver receives a receive signal from the communications channel. The receive signal may comprise an input symbol stream transmitted from the link partner. The transceiver generates an output from this input symbol stream. The receive signal may also comprise a signal representing energy from any number of interference sources, e.g., an echo signal representing the original transmitted signal that has been reflected back towards the transceiver. The transmitted signal may be reflected back due to a channel fault such as an open cable, shorted cable, unmatched load or any irregularities in impedance along the length of the cable. Such irregularities may be caused by broken, bad or loose connectors, damaged cables or other faults.

The Ethernet PHY environment is typically exposed to diverse interference sources.

Several of these interference sources are illustrated in FIG. 1, and include: near-end echo 26, far-end echo 20, attenuation 24, near-end crosstalk 28 and far-end crosstalk 22. The main interference sources (i.e. Ethernet impairments or noise sources) an Ethernet transceiver is exposed to are described below. Note that these and other impairments may be applicable to other communication link PHY schemes and are not to be limited to gigabit Ethernet. The requirements of the impairments to be monitored are defined by the IEEE 802.3 1000 Base-T specification. The requirements presented infra apply to a 100 meter cable at all frequencies from 1 MHz to 100 MHz.

Insertion loss/Attenuation: Insertion loss (denoted by line 24 in FIG. 1) is the intersymbol interference (ISI) introduced to the far side transmitted signal and is compensated by the equalizer in the receiver. The worst case insertion loss is defined by the IEEE 802.3 standard as:

$$\text{Insertion\_Loss}(f) < 2.1 f^{0.529} + 0.4/f \, \text{dB} \tag{1}$$

where f denotes frequency. Insertion loss and ISI interference are usually mitigated using an adaptive equalizer. The equalizer may comprise a feed forward equalizer (FFE) or feedback equalizer (FBE).

Return loss (echo)/near-end echo rejection: The echo signal (denoted by line 26 in FIG. 1) is the reflection of the transmitted signal onto the receiver path. The echo can be a near-end echo reflection due to the full duplex usage of each pair or a far-end reflection due to unmatched hardware connection components along the cable topology or at the far-side connector. The worst case far-end return loss is defined by the IEEE 802.3 standard as:

$$\text{Return\_Loss}(f) \begin{cases} 15 & (1-20 \text{ MHz}) \\ 15 - 10\log_{10}(f/20) & (20-100 \text{ MHz}) \end{cases} \text{dB} \tag{2}$$

where f denotes frequency and where the requirements for CAT5E is modified from 15 dB to 17 dB (i.e. an increase of 2 dB). Note that a high level of near-end echo signal may indicate a printed circuit board fault. Note also that the near-end echo reflection level is implementation specific and may be compensated for by the hybrid analog block 16 (FIG. 1). An adaptive echo canceller is a well-known technique for canceling echo signals. The adaptive echo canceller uses the least mean square (LMS) method or its equivalent.

Near-end crosstalk (NEXT) and far-end crosstalk (FEXT): NEXT crosstalk (denoted by lines 28 in FIG. 1) and FEXT crosstalk (denoted by line 22 in FIG. 1) are undesired signals coupled between adjacent pairs. The NEXT is noise coupled from near-side adjacent transmitters (i.e. of the other three pairs). FEXT is noise coupled from far-side adjacent transmitters. An adaptive NEXT canceller utilizing the LMS or equivalent algorithm is typically used to cancel NEXT signals. Similarly, an adaptive FEXT canceller utilizing the LMS or equivalent algorithm is typically used to cancel FEXT signals.

The worst case NEXT coupling is defined by the IEEE 802.3 standard as:

$$\text{NEXT}(f) > 27.1 - 16.8 \log_{10}(f/100) \, \text{dB} \tag{3}$$

where f denotes frequency. Note that the standard also defines the following properties:

1. Equal Level FEXT (ELFEXT) is defined as the noise coupled from far-side transmitters to a far-side link partner and can be formulated as $$\text{ELFEXT} = \text{FEXT} - \text{Insertion\_loss} \tag{4}$$

2. Multiple Disturber ELFEXT (MDELFEXT) is defined as the different ELFEXT coupled from each of the three adjacent link partners in accordance with the following masks:

$$MDELFEXT(f) = \begin{cases} 17 - 20\log_{10}(f/100) \\ 19.5 - 20\log_{10}(f/100) \text{ dB} \\ 23 - 20\log_{10}(f/100) \end{cases} \quad (5)$$

where f denotes frequency and where the sum of the three ELFEXT signals is defined as Power Sum ELFEXT (PSELFEXT) which is limited by:

$$PSELFEXT(f) > 14.4 - 20 \log_{10}(f/100) \text{ dB} \quad (6)$$

Figure 2:
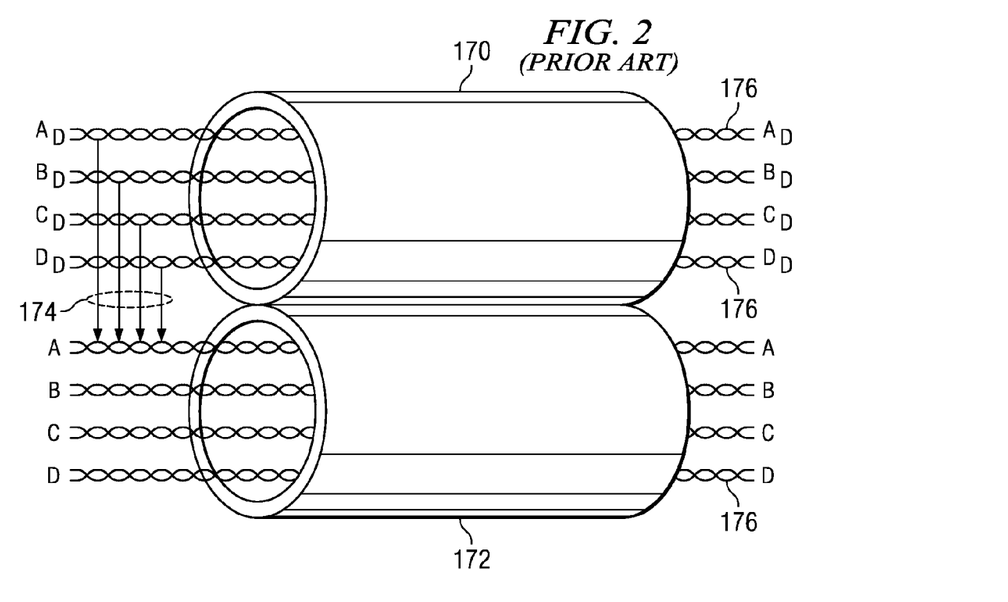
FIG. 2 is a diagram illustrating the alien NEXT (ANEXT) noise environment.

Alien NEXT (ANEXT): A diagram illustrating the alien NEXT (ANEXT) noise environment is shown in FIG. 2. The ANEXT noise (denoted by lines 174) is coupled to the modem receive path associated with the twisted pairs 176 in cable 172 from adjacent twisted pair links in cable 170. Unlike the NEXT noise signals, which are generated from a known transmitted sequence and therefore can be cancelled, the ANEXT noise signal is unknown and is thus much harder to cancel. The IEEE 802.3 standard defines the ANEXT as a 25 mV peak-to-peak signal generated by an attenuated 100 Base-TX signal coupled to one of the receiver pairs.

Note that this model for the ANEXT may not be accurate since the ANEXT cannot be separated from the external coupled noise definition. It is assumed, however, that the external noise is composed of AWGN and the colored Alien NEXT. The standard does specify the PSNEXT loss as follows:

$$PSNEXT\_loss(f) < 35 - 15 \log_{10}(f/100) \text{ dB} \quad (7)$$

where f denotes frequency.

External noise: External noise is defined by the IEEE 802.3 standard as noise coupled from external sources and is bounded at 40 mV peak-to-peak (with 3 dB LPF at 100 MHz).

The echo, NEXT and sometimes the FEXT impairments are mitigated using dedicated cancellers. These cancellers typically consume significant hardware resources and a substantial amount of digital transceiver die area. In a typical gigabit Ethernet transceiver, for example, the integrated circuit (IC) area dedicated to the canceller may consume over 50% of the total digital portion of the IC. Thus, it is advantageous to reduce the power consumption of one or more cancellers used in the receiver.

The present invention is related to, but not necessarily limited to, general communication systems there transmissions occur over several communication links in parallel. An example of such a communication system is gigabit Ethernet where communication occurs over four twisted pair wires in parallel. Communication over such systems is performed using separate or partially separate transceivers for each of the links. Often, a portion of the functionality of each link is performed separately while other functions, such as the coding or decoding are performed jointly. Such communication systems usually suffer from three types of interferences: (1) interference from the transmitter of the same transmitter, i.e. echo, (2) interference from other transmitters on the same common transceiver (NEXT), and (3) interference from transmitters from the far-end side (FEXT) of the link.

Figure 3:
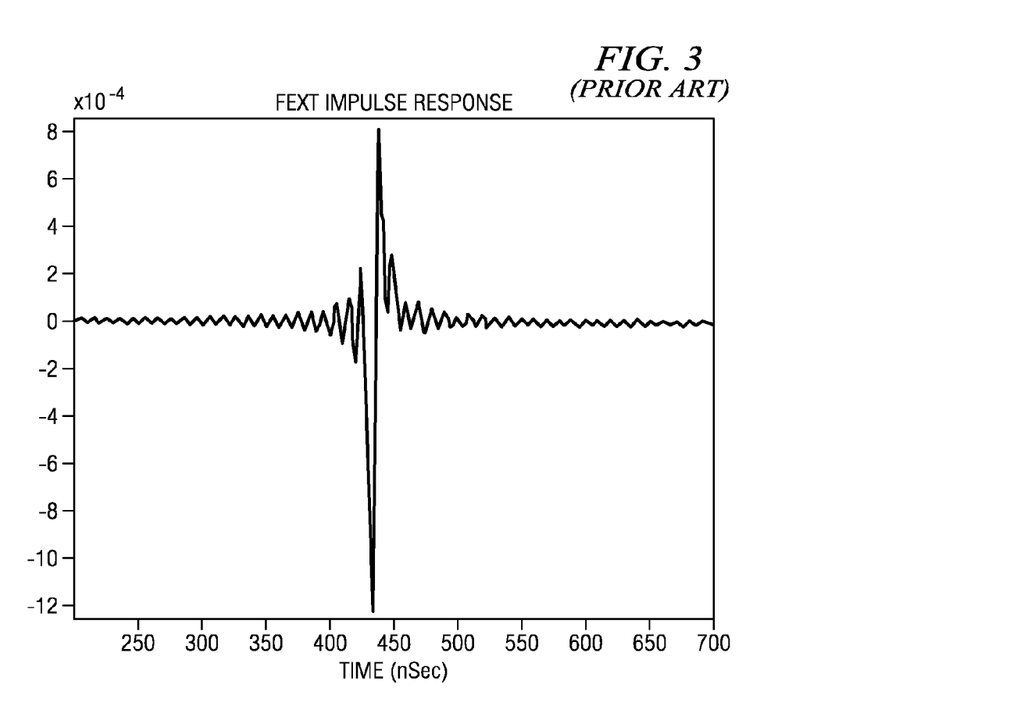
FIG. 3 is a graph illustrating the typical FEXT impulse response.

A graph of the impulse response of a typical FEXT path is shown in FIG. 3. Note that FEXT noise is typically the smallest of the three interferences and in many cases, it is not mitigated by the receiver at all. The invention provides a means of quantifying this noise for use in determining the link quality which, in turn, provides an indication of the communication rates supportable by the link. In addition, quantification of the FEXT noise permits identifying and fixing abnormal FEXT, which may be caused by a bad cable, wire pair or improper installation. The invention thus provides an efficient and robust mechanism for identifying, quantifying and analyzing the FEXT noise without disrupting regular operation of the transceiver or modem.

Figure 4:
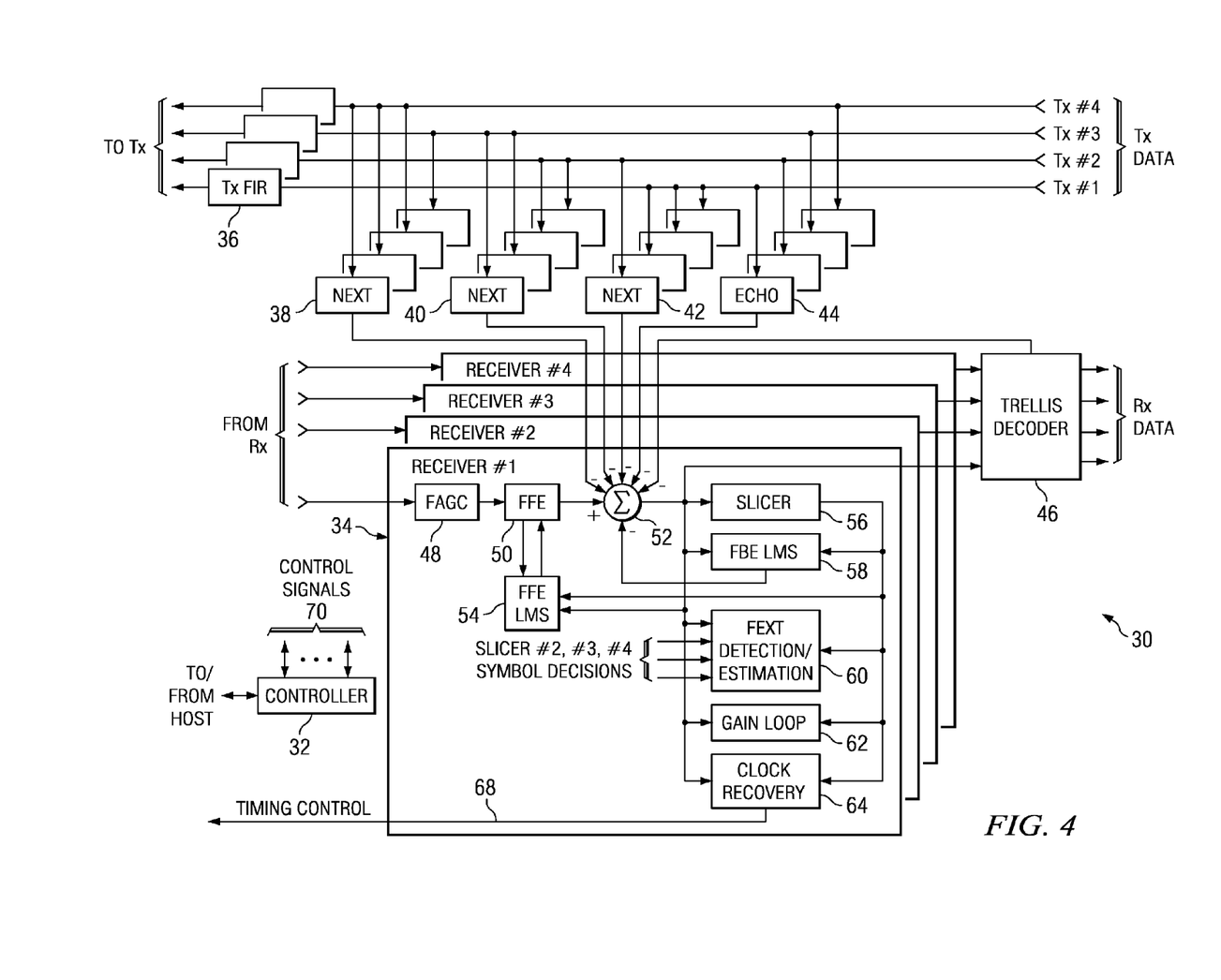
FIG. 4 is a block diagram illustrating an example communications transceiver incorporating the FEXT detection and estimation mechanism of the present invention.

A block diagram illustrating an example communications transceiver incorporating the FEXT detection and estimation mechanism of the present invention is shown in FIG. 4. The gigabit Ethernet transceiver, generally referenced 30, comprises TX FIR filter blocks 36 (one for each of four twisted pairs), four receiver blocks 34, controller 32, NEXT blocks 38, 40, 42, echo canceller 44 and Trellis decoder 46. Each of the receiver blocks 34 comprises fine automatic gain control (AGC) 48, feed forward equalizer (FFE) 50, least mean squares (LMS) block 54, adder 52, slicer 56, feedback equalizer (FBE) LMS 58, FEXT detector/estimator block 60, gain loop 62 and clock recovery block 64.

In operation, receivers #1, #2, #3 and #4 receive the appropriate NEXT and echo signals from the NEXT blocks 38, 40, 42 and echo canceller blocks 44, respectively. For each receiver, corresponding to a twisted pair, the NEXT is calculated from the TX signals for the other three pairs. For example, the NEXT for receiver #1 (i.e. pair #1), is calculated from signals TX #2, TX #3 and TX #4.

The clock recovery block generates the timing control signal 68. Controller 32 communicates with a host (not shown) and provides administration, configuration and control to the transceiver via plurality of control signals 70.

The FEXT detector/estimator blocks 60 in each of the receiver modules implement the FEXT detection and estimation mechanism of the present invention and are adapted to estimate the level of FEXT impairment. The level of FEXT impairment is determined by adapting the tap coefficients of a single tap FEXT canceller filter one at a time. A more detailed description of the single tap FEXT canceller filter is provided infra.

As described supra, the present invention provides a mechanism for the detection, estimation and quantification of FEXT noise. One approach to mitigating FEXT is to perform FEXT filtering. The description below assumes a single FEXT path between two receivers. Note, however, that the invention can be applied to any number of transceivers. FEXT cancellation can be performed using forward FEXT filtering or backward FEXT filtering. The difference being that forward FEXT filtering is linear whereby signal filtering occurs along the data path, before the slicer or Viterbi operations. Backward filtering is performed on decisions, e.g., decisions made by the slicer, the Viterbi algorithm or intermediate decisions of the Viterbi algorithm and is, therefore, nonlinear.

In an implementation of a forward FEXT canceller, no delays lines are inserted along the data path, so that a forward FEXT canceller is used for cancellation of "non-causal" FEXT coefficients. On the other end, implementation of a backward FEXT canceller is used for cancellation of "causal" FEXT coefficients, which is also implemented without a delay line along the data path, but with a delay line for slicer decisions.

The implementation of the FEXT detector presented herein mimics the case of a backward FEXT canceller, however all the FEXT filter coefficients (i.e. both causal and non-causal) are treated as causal by adding an additional delay on the data path, or equivalently the slicer error. This is possible since no true cancellation is performed, making the system insensitive to any extra delay on the FEXT training mechanism.

Figure 5:
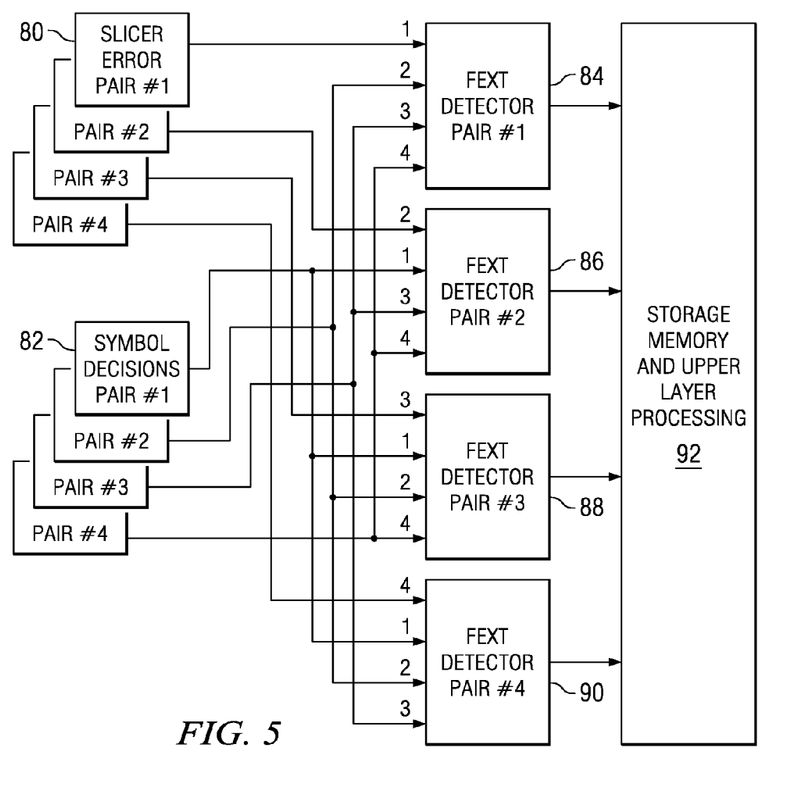
FIG. 5 is a block diagram illustrating an example embodiment of the FEXT estimator and detector adapted for use with Gigabit Ethernet.

A block diagram illustrating an example embodiment of the FEXT estimator and detector adapted for use with Gigabit Ethernet is shown in FIG. 5. With reference to FIG. 4, each of the receivers 34 have associated with them a FEXT detector/estimator block. In particular, FEXT detector #1 84 is operative to detect and estimate FEXT present on pair #1; FEXT detector #2 86 is operative to detect and estimate FEXT present on pair #2; FEXT detector #3 88 is operative to detect and estimate FEXT present on pair #3; and FEXT detector #4 90 is operative to detect and estimate FEXT present on pair #4.

In order to detect FEXT, each detector requires the symbol decision error 80 (i.e. slicer error) from its corresponding receiver and the symbol decisions 82 from the other three wire pairs. In particular, FEXT detector for pair #1 receives the slicer error from pair #1 and the symbol decisions from pairs #2, #3 and #4; FEXT detector for pair #2 receives the slicer error from pair #2 and the symbol decisions from pairs #1, #3 and #4; FEXT detector for pair #3 receives the slicer error from pair #3 and the symbol decisions from pairs #1, #2, and #4; and FEXT detector for pair #4 receives the slicer error from pair #4 and the symbol decisions from pairs #1, #2 and #3. The output of each of the FEXT detectors is input to a storage memory and processed further by upper layer processing in accordance with the actual implementation of the invention.

In accordance with the invention, the FEXT filters that can be used for FEXT cancellation can be used for FEXT detection as well. The same FEXT filter that can be trained for cancellation can be trained for detection purposes only. The FEXT filter tap coefficients are obtained using a relatively inexpensive and effective mechanism described below. The adaptation of FEXT filter coefficients is performed tap-by-tap (i.e. a single tap at a time as if it were a single tap FEXT canceller) using hardware that is shared by all taps. In contrast to FEXT cancellation, the FEXT detector of the present invention does not impose any processing delay on the main data path since cancellation is not performed.

Figure 6:
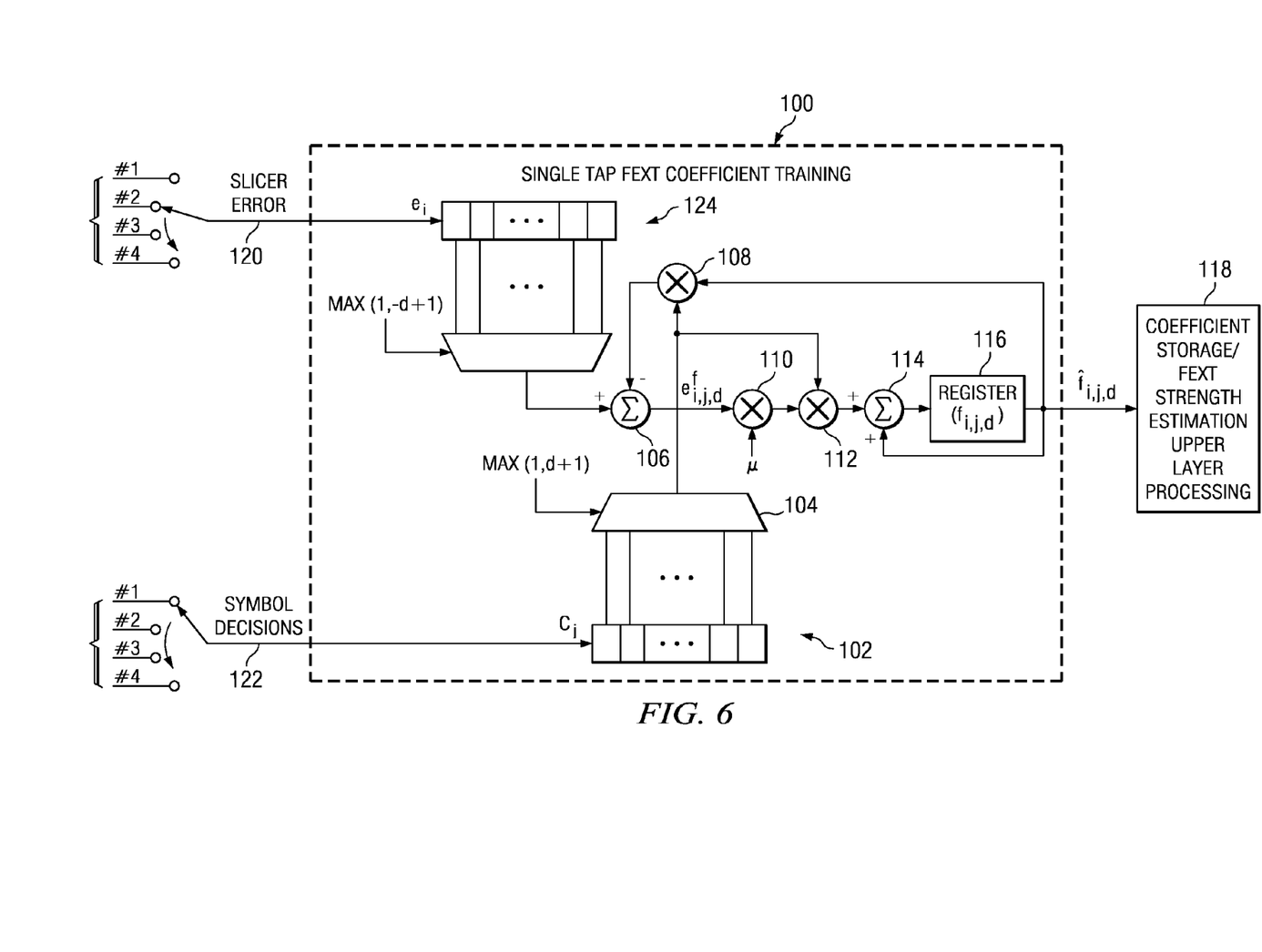
FIG. 6 is a block diagram illustrating an example embodiment of the single tap FEXT detector training module constructed in accordance with the present invention.

A block diagram illustrating an example embodiment of the single tap FEXT canceller training module constructed in accordance with the present invention is shown in FIG. 6. The single tap FEXT coefficient training block, generally referenced 100, comprises a slicer error (i.e. decision error) delay line 124, multiplexer 126, symbol decision delay line 102, multiplexer 104, summers 106, 114, multipliers 110, 112, 108 and register 116.

The output of the coefficient training is input to upper layer processing block 118 which functions to provide coefficient storage, means for estimating the FEXT strength and any other desired processing to be performed on the FEXT filter coefficients.

The FEXT coefficient training block 100 is operative to train a single tap coefficient of a multi-tap FEXT filter. Each tap of the filter is trained over a plurality of symbols (e.g., 100s, 1000s or 10,000s). The expressions used for training a single tap coefficient are given by the following Equations 8, 9, 10, 11 and 12:

$$e_i(n) = a_i(n) - z_i(n) \tag{8}$$

where $e_i(n)$ is the decision error (i.e. slicer error) at pair i;

$a_i(n)$ represents the slicer output;

$z_i(n)$ represents the slicer input;

If d is positive:

$$e_{i,j,d}{}^f(n) = e_i(n) - f_{i,j,d}(n) \cdot c_j(n-d) \tag{9}$$

If d is negative:

$$e_{i,j,d}{}^f(n) = e_i(n-d) - f_{i,j,d}(n) \cdot c_j(n) \tag{10}$$

where $e_{i,j,d}{}^f(n)$ is the error at pair i after single tap FEXT cancellation of pair j with a delay of d symbols;

(i,j) tag represents a specific impairment path;

d represents the index of the coefficient within the delay line 102 that is to be trained (takes positive and negative values to represent the causal and non-causal parts of the FEXT filter, respectively);

n is a time index;

$f_{i,j,d}(n)$ is the estimation of the single FEXT filter coefficient currently being trained, at time index n;

$c_j(n-d)$ is the received symbol decision at the adjacent $j^{th}$ pair with a delay of d symbols;

The tap $f_{i,j,d}(n)$ is updated in accordance with the LMS algorithm as follows:

If d is positive:

$$f_{i,j,d}(n+1) = f_{i,j,d}(n) + \mu \cdot e_{i,j,d}{}^f(n) \cdot c_j(n-d) \tag{11}$$

If d is negative:

$$f_{i,j,d}(n+1) = f_{i,j,d}(n) + \mu \cdot e_{i,j,d}{}^f(n) \cdot c_j(n) \tag{12}$$

where μ is the LMS step size;

Note that the delay d determines which tap of the FEXT canceller filter is currently being trained. The circuit of FIG. 6 is operative to implement Equations 9, 10, 11 and 12 (update the numbers). The slicer error $e_i$ 120 forms one of the two inputs to the trainer. The symbol decisions $c_j$ 122 forms the second input. The symbol decisions are input to the delay line 102. The appropriate data tap from multiplexer 104 is selected via the select line which is the maximum of either 1 or d+1. Similarly, the decision errors (e.g., slicer errors) are input to the delay line 124. The appropriate data tap is selected from multiplexer 126 via the select line which is the maximum of either 1 or −d+1. Note that positive d is used for training the causal filter taps and negative d is used for training of the non-causal filter taps.

The LMS based training operation is performed a plurality of times for the entire range of expected delays (corresponding to the FEXT canceller length supported). For each iteration, a single FEXT filter coefficient is calculated. Each coefficient is stored in memory and once estimation of all coefficients is complete, any desired processing can then be performed. For example, the sum of the squares of all coefficients is calculated in order to provide a measure of the FEXT energy. In another example, a DFT measurement of the FEXT coefficients provides a spectral analysis of the FEXT channel.

Assuming a gigabit Ethernet network with four parallel wire pairs A, B, C, D, the above described tap training procedure must be performed three times for each pair (i.e. to measure FEXT from pair B to A, C to A and D to A). If each single tap LMS based coefficient estimate takes approximately 25,000 symbols to complete and the delay range (i.e. number of taps) is −20 to +20, it will take 1 million symbols for a single FEXT measurement (e.g., pair B to A). It will thus take 3 million symbols to measure the entire FEXT energy on a single pair. Considering the other three pairs of a four pair cable, yields a total of 12 million symbols. Thus, the LMS step size μ must be small enough since the FEXT noise caused by other taps and by other adjacent channels is treated as additional noise during the adaptation of each tap. Once the adaptation of each tap is complete, the coefficient is stored in memory or passed to a host computer which functions to implement, for example, a higher layer cable diagnostic algorithm.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A far-end crosstalk (FEXT) detector, comprising:
   a first delay line adapted to receive a plurality of symbol decisions and to output delayed symbol decisions therefrom;
   a second delay line adapted to receive a plurality of slicer errors and to output delayed slicer errors therefrom; and
   single tap FEXT canceller training means coupled to said delay lines and operative to generate a single FEXT filter coefficient as a function of a previous FEXT filter coefficient update, said delayed symbol decisions and delayed decision error signal without disturbing a regular operation mode, wherein said training means is operative to generate said single FEXT filter coefficient in accordance with the following equations:
   if d (index of coefficients within said delay lines) is positive:

$e_{i,j,d}f(n)=e_i(n)-f_{i,j,d}(n)\cdot c_j(n-d)$ $f_{i,j,d}(n+1)=f_{i,j,d}(n)+\mu\cdot e_{i,j,d}f(n)\cdot c_j(n-d)$ if d is negative:

$e_{i,j,d}f(n)=e_i(n-d)-f_{i,j,d}(n)\cdot c_j(n)$ $f_{i,j,d}(n+1)=f_{i,j,d}(n)+\mu\cdot e_{i,j,d}f(n)\cdot c_j(n)$ wherein $e_i(n)$ is the decision error at pair i, $e_{i,j,d}f(n)$ is the error at pair i after single tap FEXT cancellation of pair j, $f_{i,j,d}(n)$ is the single FEXT filter coefficient being trained, $c_j(n-d)$ is the received symbol decision at the adjacent $j^{th}$ pair with a delay of d symbols and μ is the step size.

2. The FEXT detector according to claim 1, wherein said decision error signal comprises a slicer error signal.

3. The FEXT detector according to claim 1, further comprising means for calculating FEXT energy as a function of said single FEXT filter coefficient.

4. The FEXT detector according to claim 1, further comprising means for calculating a FEXT spectrum as a function of said single FEXT filter coefficient.

5. An apparatus for estimating far-end crosstalk (FEXT) in a communications system, comprising:
   a decision error input;
   a symbol decision input;
   a first delay line coupled to said symbol decision input and operative to generate delayed symbols therefrom;
   a second delay line coupled to a slicer error input and operative to generate delayed slicer error therefrom; and
   training means operative to calculate a current single tap FEXT filter coefficient update as a function of a previous FEXT filter coefficient update, said decision error input and said delayed symbols without disturbing a regular operation mode, wherein said training means is operative to generate said current single FEXT filter coefficient update in accordance with the following equations:
   if d (index of coefficients within said delay lines) is positive:

$e_{i,j,d}f(n)=e_i(n)-f_{i,j,d}(n)\cdot c_j(n-d)$ $f_{i,j,d}(n+1)=f_{i,j,d}(n)+\mu\cdot e_{i,j,d}f(n)\cdot c_j(n-d)$ if d is negative:

$e_{i,j,d}f(n)=e_i(n-d)-f_{i,j,d}(n)\cdot c_j(n)$ $f_{i,j,d}(n+1)=f_{i,j,d}(n)+\mu\cdot e_{i,j,d}f(n)\cdot c_j(n)$ wherein $e_i(n)$ is the decision error at pair i, $e_{i,j,d}f(n)$ is the error at pair i after single tap FEXT cancellation of pair j, $f_{i,j,d}(n)$ is the single FEXT filter coefficient being trained, $c_j(n-d)$ is the received symbol decision at the adjacent $j^{th}$ pair with a delay of d symbols and μ is the step size.

6. The apparatus according to claim 5, wherein said decision error input comprises said slicer error input signal.

7. The apparatus according to claim 5, further comprising means for calculating FEXT energy as a function of said single FEXT filter coefficient.

8. The apparatus according to claim 5, further comprising means for calculating FEXT spectrum as a function of said single FEXT filter coefficient.

9. A communications transceiver, comprising:
   a transmitter coupled to a communications channel;
   a receiver coupled to said communications channel;
   a far-end crosstalk (FEXT) detector, comprising:
      a decision error input;
      a symbol decision input;
      a first delay line coupled to said symbol decision input and operative to generate delayed symbols therefrom;
      a second delay line coupled to said decision error input and operative to generate delayed decision errors therefrom; and
      training means operative to calculate a current single tap FEXT filter coefficient update as a function of a previous FEXT filter coefficient update, said delayed decision errors and said delayed symbols without disturbing a regular operation mode, wherein said training means is operative to generate said current single FEXT filter coefficient update in accordance with the following equations:
      if d (index of coefficients within said delay lines) is positive:

$e_{i,j,d}f(n)=e_i(n)-f_{i,j,d}(n)\cdot c_j(n-d)$ $f_{i,j,d}(n+1)=f_{i,j,d}(n)+\mu\cdot e_{i,j,d}f(n)\cdot c_j(n-d)$ if d is negative:

$e_{i,j,d}f(n)=e_i(n-d)-f_{i,j,d}(n)\cdot c_j(n)$ $f_{i,j,d}(n+1)=f_{i,j,d}(n)+\mu\cdot e_{i,j,d}f(n)\cdot c_j(n)$ wherein $e_i(n)$ is the decision error at pair i, $e_{i,j,d}f(n)$ is the error at pair i after single tap FEXT cancellation of pair j, $f_{i,j,d}(n)$ is the single FEXT filter coefficient being trained, $c_j(n-d)$ is the received symbol decision at the adjacent $j^{th}$ pair with a delay of d symbols and μ is the step size.

10. The transceiver according to claim 9, wherein said communications transceiver comprises a Gigabit Ethernet transceiver.

11. The transceiver according to claim 9, wherein said decision error input comprises a slicer error input signal.

12. The transceiver according to claim 9, further comprising means for calculating FEXT energy as a function of said single FEXT filter coefficient.

13. The transceiver according to claim 9, further comprising means for calculating FEXT spectrum as a function of said single FEXT filter coefficient.

* * * * *